US010904643B2

(12) United States Patent
Gaubitch et al.

(10) Patent No.: US 10,904,643 B2
(45) Date of Patent: *Jan. 26, 2021

(54) CALL CLASSIFICATION THROUGH ANALYSIS OF DTMF EVENTS

(71) Applicant: PINDROP SECURITY, INC., Atlanta, GA (US)

(72) Inventors: Nick Gaubitch, Atlanta, GA (US); Scott Strong, Atlanta, GA (US); John Cornwell, Atlanta, GA (US); Hassan Kingravi, Atlanta, GA (US); David Dewey, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,286

(22) Filed: Apr. 8, 2019

(65) Prior Publication Data

US 2019/0238956 A1    Aug. 1, 2019

Related U.S. Application Data

(63) Continuation of application No. 15/600,625, filed on May 19, 2017, now Pat. No. 10,257,591.

(Continued)

(51) Int. Cl.
*H04M 1/56*        (2006.01)
*H04M 15/06*       (2006.01)
(Continued)

(52) U.S. Cl.
CPC ............... *H04Q 3/70* (2013.01); *G10L 25/51* (2013.01); *H04L 25/0202* (2013.01);
(Continued)

(58) Field of Classification Search
None
See application file for complete search history.

(56) References Cited

U.S. PATENT DOCUMENTS 5,442,696 A  *  8/1995  Lindberg  ............. H04Q 1/4575
                                                        379/386
5,570,412 A     10/1996  LeBlanc
(Continued)

OTHER PUBLICATIONS

H. Schulzrinne et al., "RTP Payload for DTMF Digits, Telephone Tones, and Telephony Signals" Columbia University, Dec. 2006, <https://tools.ietf.org/html/rfc4733.>.

(Continued)

*Primary Examiner* — Quoc D Tran
(74) *Attorney, Agent, or Firm* — Foley & Lardner LLP

(57) ABSTRACT

Systems, methods, and computer-readable media for call classification and for training a model for call classification, an example method comprising: receiving DTMF information from a plurality of calls; determining, for each of the calls, a feature vector including statistics based on DTMF information such as DTMF residual signal comprising channel noise and additive noise; training a model for classification; comparing a new call feature vector to the model; predicting a device type and geographic location based on the comparison of the new call feature vector to the model; classifying the call as spoofed or genuine; and authenticating a call or altering an IVR call flow.

19 Claims, 14 Drawing Sheets

Related U.S. Application Data

(60) Provisional application No. 62/370,135, filed on Aug. 2, 2016, provisional application No. 62/370,122, filed on Aug. 2, 2016.

(51) Int. Cl.
| | | |
|---|---|---|
| *H04Q 3/70* | (2006.01) | |
| *H04M 3/22* | (2006.01) | |
| *H04M 7/12* | (2006.01) | |
| *H04Q 1/45* | (2006.01) | |
| *G10L 25/51* | (2013.01) | |
| *H04L 25/02* | (2006.01) | |
| *H04M 3/493* | (2006.01) | |

(52) U.S. Cl.
CPC ......... *H04M 3/2281* (2013.01); *H04M 3/493* (2013.01); *H04M 7/1295* (2013.01); *H04Q 1/45* (2013.01); *H04M 2201/18* (2013.01); *H04M 2203/60* (2013.01); *H04Q 2213/13139* (2013.01); *H04Q 2213/13405* (2013.01); *H04Q 2213/13515* (2013.01)

(56) References Cited

U.S. PATENT DOCUMENTS

| | | | |
|---|---|---|---|
| 5,724,404 A | 3/1998 | Garcia et al. | |
| 5,825,871 A | 10/1998 | Mark | |
| 6,041,116 A | 3/2000 | Meyers | |
| 6,134,448 A | 10/2000 | Shoji et al. | |
| 6,654,459 B1 | 11/2003 | Bala et al. | |
| 6,735,457 B1 | 5/2004 | Link, II et al. | |
| 6,765,531 B2 | 7/2004 | Anderson | |
| 7,787,598 B2 | 8/2010 | Agapi et al. | |
| 8,050,393 B2 | 11/2011 | Apple et al. | |
| 8,223,755 B2 | 7/2012 | Jennings et al. | |
| 8,311,218 B2 | 11/2012 | Mehmood et al. | |
| 8,385,888 B2 | 2/2013 | Labrador et al. | |
| 9,060,057 B1 | 6/2015 | Danis | |
| 9,078,143 B2 | 7/2015 | Rodriguez et al. | |
| 10,257,591 B2 * | 4/2019 | Gaubitch | G10L 25/51 |
| 2002/0181448 A1 | 12/2002 | Uskela et al. | |
| 2003/0012358 A1 * | 1/2003 | Kurtz | H04M 3/005 |
| | | | 379/346 |
| 2011/0051905 A1 * | 3/2011 | Maria Poels | H04M 3/02 |
| | | | 379/32.01 |
| 2011/0123008 A1 * | 5/2011 | Sarnowski | H04L 63/0853 |
| | | | 379/93.02 |
| 2015/0120027 A1 | 4/2015 | Cote et al. | |
| 2016/0293185 A1 | 10/2016 | Cote et al. | |
| 2017/0222960 A1 | 8/2017 | Agarwal et al. | |
| 2017/0302794 A1 * | 10/2017 | Spievak | H04M 3/436 |
| 2017/0359362 A1 | 12/2017 | Kashi et al. | |

OTHER PUBLICATIONS

Notification of Transmittal of the International Search Report and the Written Opinion of the International Searching Authority, or the Declaration issued in PCT/US2017/044849 dated Jan. 11, 2018.
Canadian Examination Report dated Oct. 16, 2019, issued in corresponding Canadian Application No. 3,032,807, 3 pages.

* cited by examiner

CALL CLASSIFICATION THROUGH ANALYSIS OF DTMF EVENTS

CROSS-REFERENCE TO RELATED APPLICATIONS

This application is continuation of U.S. patent application Ser. No. 15/600,625, filed May 19, 2017, which claims priority to U.S. Provisional Patent Application Ser. No. 62/370,135, filed Aug. 2, 2016, and to U.S. Provisional Patent Application Ser. No. 62/370,122, filed Aug. 2, 2016, all of which are hereby incorporated by reference in their entirety.

BACKGROUND

Dual-tone multifrequency (DTMF) signaling conveys information over the telephone network. DTMF tones—commercially known as "touch-tones"—are often used to communicate a telephone number to a switch, but they are also becoming an important component in the growing use of Interactive Voice Response (IVR) systems.

IVR systems are a common method for an initial interface with a user at a call center. Before (and if at all) a user is routed to an agent, the user may be prompted to enter some details that identify the user and the user's specific query. The entry is typically performed using the telephone keypad.

There are sixteen different DTMF tones (defining digits 0-9, #, *, and A, B, C, D) defined using combinations of eight different single-frequency tones. As telecommunication devices and protocols progress and develop, the definition for generating DTMF tones also changes depending on the device type. So-called "plain old telephone service" (POTS) landline phones, Global System for Mobile Communications (GSM) cell phones, and Voice over Internet Protocol (VOIP) phones all handle DTMF differently. Furthermore, as DTMF tones traverse the public switched telephone network (PSTN) network, they will be modified slightly due to noise and other effects due to the communication channel. In most cases, these modifications are gentle enough not to affect the DTMF detection algorithms that map the audio signal to its corresponding value (e.g. 0-9, #, *, and A, B, C, D).

As recognized by the inventors, the audio signal of DTMF tones generated by a far end user will exhibit deviations from an "ideal" DTMF tone when observed at the near end of a call. This discrepancy will depend on the type of device used and on the relative geographical locations of the near and far end users. The ideal DTMF tone is known a priori, and by calculating various statistical entities based on the difference between the ideal DTMF tone and the observed, the device type and the relative geographic location of a user can be provided.

As recognized by the inventors, different makes and models of telephones, smartphones, and softphones often have uniquely identifiable DTMF tones. By monitoring the tones of a known device type, phone number, or user, future tones can be used to determine the device type or authenticity of the phone number or user.

SUMMARY

In general, one aspect of the subject matter described in this specification can be embodied in a computer-implemented method to classify a call, the computer-implemented method comprising: receiving dual-tone multifrequency (DTMF) information from a call; determining a feature vector based on the DTMF information; comparing the feature vector to a model; and classifying the call based on the comparison of the feature vector to the model.

These and other embodiments can optionally include one or more of the following features. In at least one embodiment of the computer-implemented method to classify the call, the computer-implemented method to classify the call further comprises prompting, by an Interactive Voice Response (IVR) system, entry of the DTMF information.

In at least one embodiment, the computer-implemented method to classify the call further comprises determining an ideal DTMF tone, wherein the determining the feature vector based on the DTMF information includes determining a feature based on the ideal DTMF tone.

In at least one embodiment, the computer-implemented method to classify the call further comprises estimating channel noise in a DTMF tone, wherein the determining the feature vector based on the DTMF information includes determining a feature based on the channel noise.

In at least one embodiment, the computer-implemented method to classify the call further comprises estimating additive noise in a DTMF tone, wherein the determining the feature vector based on the DTMF information includes determining a feature based on the additive noise.

In at least one embodiment of the computer-implemented method to classify the call, the feature vector is a vector of features including at least one feature, and the at least one feature is based on at least one of a mean, a median, a variance, a standard deviation, a frequency, a wavelength, a duration, a coefficient of variation, or a percentile of DTMF information.

In at least one embodiment, the computer-implemented method to classify the call further comprises receiving DTMF information from a far end of the call.

In at least one embodiment of the computer-implemented method to classify the call, the receiving DTMF information from the call is done by an Interactive Voice Response (IVR) system at a near end of the call.

In at least one embodiment, wherein the classifying the call based on the comparison of the feature vector to the model includes predicting, based on the comparison of the feature vector to the model, a device type of a device that provides the DTMF information, the computer-implemented method further comprises comparing the predicted device type to an expected device type associated with a phone number of the call.

In at least one embodiment, the computer-implemented method to classify the call further comprises classifying the call as spoofed based on the comparison of the predicted device type to the expected device type.

In at least one embodiment, the computer-implemented method to classify the call further comprises authenticating at least one of the call or a party to the call based on the comparison of the predicted device type to the expected device type.

In at least one embodiment, wherein the classifying the call based on the comparison of the feature vector to the model includes predicting, based on the comparison of the feature vector to the model, a relative geographic location of a party to the call, the computer-implemented method further comprises: comparing the predicted relative geographic location of the party to the call to an expected geographic location associated with a phone number of the call.

In at least one embodiment, the computer-implemented method to classify the call further comprises classifying the call as spoofed based on the comparison of the relative geographic location of the party to the call to the expected geographic location.

In at least one embodiment, the computer-implemented method to classify the call further comprises authenticating at least one of the call or a party to the call based on the comparison of the relative geographic location of the party to the call to the expected geographic location.

In general, one aspect of the subject matter described in this specification can be embodied in a computer-implemented method to train a model for call classification, the computer-implemented method comprising: receiving dual-tone multifrequency (DTMF) information from a plurality of calls; determining, for each of the calls, a feature vector based on the DTMF information of the call; and training a model on the feature vectors.

These and other embodiments can optionally include one or more of the following features. In at least one embodiment, wherein the DTMF information from each of the calls is from a same phone number, the computer-implemented method to train the model for call classification further comprises: receiving DTMF information from a new call; determining a new call feature vector based on the DTMF information from the new call; comparing the new call feature vector to the model; and predicting, based on the comparison of the new call feature vector to the model, the new call as having a same device type as a device type of the plurality of calls.

In at least one embodiment, wherein the plurality of calls includes genuine calls and spoofed calls, the computer-implemented method to train the model for call classification further comprises: receiving DTMF information from a new call; determining a new call feature vector based on the DTMF information from the new call; comparing the new call feature vector to the model; and predicting, based on the comparison of the new call feature vector to the model, the new call as genuine or spoofed.

In at least one embodiment of the computer-implemented method to train the model for call classification, the feature vector is a vector of features including at least one feature, and the at least one feature is based on at least one of a mean, a median, a variance, a standard deviation, a frequency, a wavelength, an amount of time, a coefficient of variation, or a percentile of DTMF information.

In at least one embodiment, wherein the plurality of calls are each from a same device type, the computer-implemented method to train the model for call classification further comprises: receiving DTMF information from a new call; determining a new call feature vector based on the DTMF information from the new call; comparing the new call feature vector to the model; and predicting, based on the comparison of the new call feature vector to the model, the new call as having the same device type as the device type of the plurality of calls.

In at least one embodiment of the computer-implemented method to train the model for call classification, the predicting, based on the comparison of the new call feature vector to the model, the new call as having the same device type as the device type of the plurality of calls includes estimating a probability that the new call has the same device type as the device type of the plurality of calls.

In at least one embodiment, wherein the plurality of calls are from a same device, the computer-implemented method to train the model for call classification further comprises: receiving DTMF information from a new call; determining a new call feature vector based on the DTMF information from the new call; comparing the new call feature vector to the model; and predicting, based on the comparison of the new call feature vector to the model, a device of the new call is the same device.

In at least one embodiment of the computer-implemented method to train the model for call classification, at least one of the device of the plurality of calls or a party to the plurality of calls is authenticated before providing DTMF information.

In at least one embodiment of the computer-implemented method to train the model for call classification, at least one of the device of the new call or a party to the new call is authenticated based on the comparison of the new call feature vector to the model.

In at least one embodiment of the computer-implemented method to train the model for call classification, the determining, for each of the calls, a feature vector based on the DTMF information of the call includes determining a DTMF residual signal of the call, the feature vector of each call is a vector of features including at least one feature, and the at least one feature is based on the DTMF residual signal.

In at least one embodiment of the computer-implemented method to train the model for call classification, the DTMF residual signal includes at least one of channel noise or additive noise, and the at least one feature is based on at least one of channel noise or additive noise.

In at least one embodiment, the computer-implemented method to train the model for call classification further comprises: determining an estimate of the channel noise; and determining an estimate of the additive noise, wherein the at least one feature is based on at least one of the estimate of the channel noise or the estimate of the additive noise.

In at least one embodiment of the computer-implemented method to train the model for call classification, the DTMF information from each of the calls is from a same phone number.

In at least one embodiment, the computer-implemented method to train the model for call classification further comprises: receiving DTMF information from a new call from the same phone number; determining a new call feature vector based on the DTMF information from the new call; comparing the new call feature vector to the model; and at least one of the following: classifying the new call as from a same device as a device of each of the plurality of calls; or classifying the new call as from a different device as a device of each of the plurality of calls.

In at least one embodiment, the computer-implemented method to train the model for call classification further comprises at least one of the following: authenticating at least one of the new call or a party to the new call based on the comparison of the new call feature vector to the model; or classifying the call as spoofed based on the comparison of the new call feature vector to the model.

In at least one embodiment, wherein the model is a classifier for device type and geographic location, the computer-implemented method to train the model for call classification further comprises: determining, for a new call, a new call feature vector based on the new call; comparing the new call feature vector to the model; and predicting, based on the comparison of the new call feature vector to the model, a device type and geographic location.

In at least one embodiment, the computer-implemented method to train the model for call classification further comprises: comparing the predicted device type to an expected device type associated with a phone number of the new call; comparing the predicted geographic location to an expected geographic location associated with the phone number of the new call; and classifying the call as spoofed if the predicted device type does not match the expected device type and the predicted geographic location does not match the expected geographic location.

In general, one aspect of the subject matter described in this specification can be embodied in a system that trains a model for call classification, the system comprising: at least one processor; and a non-transitory computer readable medium coupled to the at least one processor having instructions stored thereon that, when executed by the at least one processor, cause the at least one processor to: receive dual-tone multifrequency (DTMF) information from a plurality of calls; determine, for each of the calls, a DTMF residual signal of the call and a feature vector based on the DTMF information of the call, wherein the feature vector of each call is a vector of features including at least one feature, and wherein the at least one feature is based on the DTMF residual signal; and train a model on the feature vectors, wherein the model is a classifier for device type and geographic location; determine, for a new call, a new call feature vector based on the new call; compare the new call feature vector to the model; predict, based on the comparison of the new call feature vector to the model, a device type and geographic location; compare the predicted device type to an expected device type associated with a phone number of the new call; compare the predicted geographic location to an expected geographic location associated with the phone number of the new call; and classify the call as spoofed if the predicted device type does not match the expected device type and the predicted geographic location does not match the expected geographic location.

In general, one aspect of the subject matter described in this specification can be embodied in one or more non-transitory computer readable media storing a model in a computer-implemented method to classify a call, the computer-implemented method comprising: receiving dual-tone multifrequency (DTMF) information from a call; determining a feature vector based on the DTMF information; comparing the feature vector to the model; and classifying the call based on the comparison of the feature vector to the model.

The details of one or more embodiments are set forth in the accompanying drawings which are given by way of illustration only, and the description below. Other features, aspects, and advantages will become apparent from the description, the drawings, and the claims. Like reference numbers and designations in the various drawings indicate like elements.

DETAILED DESCRIPTION

Figure 1:
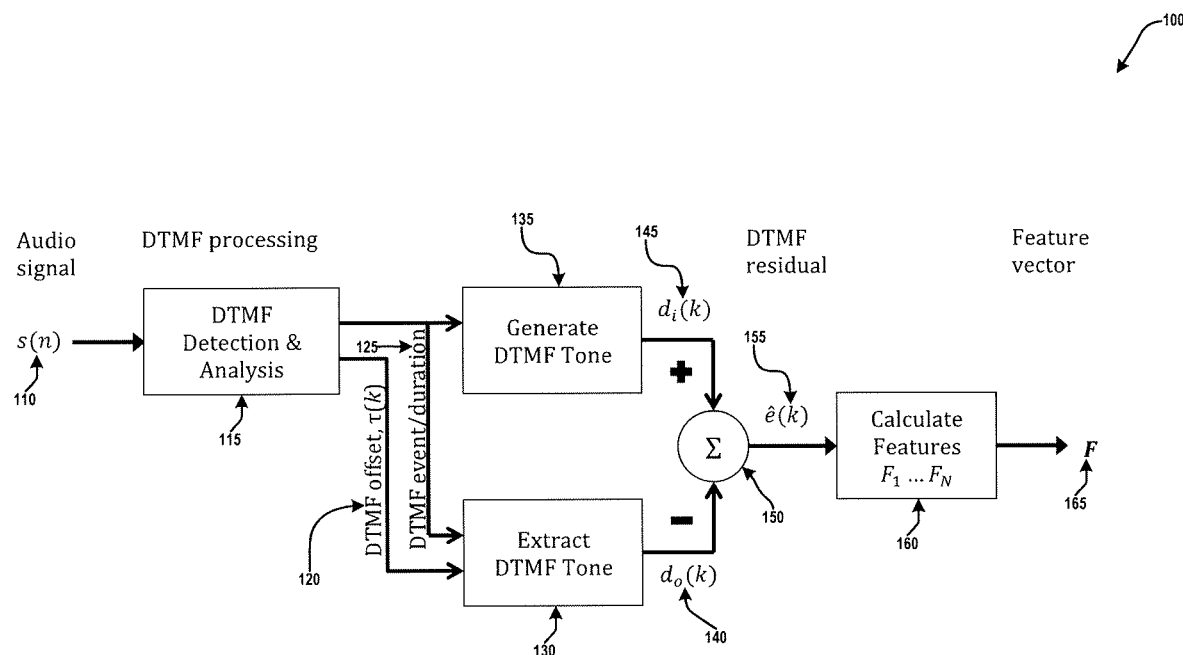
FIG. 1 is a block diagram illustrating a feature extraction process according to at least one embodiment.

A DTMF tone is the superimposition of two tones at two different frequencies. For example, the DTMF tone corresponding to the number 7 is a superimposition of tones at 852 Hz and 1209 Hz. Table 1 sets forth the frequencies corresponding to various DTMF tones.

TABLE 1

Frequencies corresponding to various DTMF tones

|  | 1209 Hz | 1336 Hz | 1477 Hz | 1663 Hz |
| --- | --- | --- | --- | --- |
| 697 Hz | 1 | 2 | 3 | A |
| 770 Hz | 4 | 5 | 6 | B |
| 852 Hz | 7 | 8 | 9 | C |
| 941 Hz | * | 0 | # | D |

An ideal DTMF tone is a DTMF tone having a superimposition of two frequencies as provided in Table 1. For example, the ideal DTMF tone corresponding to the number 7 is the superimposition of tones at 852 Hz and 1209 Hz.

As used herein, a "call" may be a telephone call, a call made by a mobile or smartphone, a call made by a softphone, or a call made by a VOIP phone. A call may traverse a PSTN, a GSM network, or an Internet Protocol network.

When the DTMF tone is produced at a far end of the call, it is an ideal DTMF tone that is, or is intended to be very close to, a superimposition of two frequencies as provided in Table 1. For example, an ideal DTMF tone corresponding to the number 7 is, or is intended to be very close to, the superimposition of tones at 852 Hz and 1209 Hz.

The DTMF tone received at the near end of the call is observed after it has traversed the phone network and is a noisy version of the ideal DTMF tone. Let $d_o(k)$ represent the kth observed DTMF tone. Let $d_i(k)$ represent the kth ideal DTMF tone. Then, $$d_o(k)=d_i(k)*h(k)+e(k)$$

where h(k) characterizes the convolutive channel noise, e(k) represents additive noise, and "*" denotes linear convolution. The convolutive noise is observed as multiplication in the frequency domain.

The channel noise is noise that is mathematically defined as convolution and is typically due to, for example, echoes or band-limiting operations that occur throughout the network.

The additive noise is noise that is mathematically defined as addition and could be, for example, cross-channel noise.

Existing algorithms for detecting and translating DTMF events are robust to channel and noise errors in the observed signal. Consequently, the ideal DTMF tone may be extracted. The ideal DTMF tone may then be generated locally. An estimate may be made of the channel noise $\hat{h}_c(k)$ and additive noise $\hat{e}(k)$ present in the observed tone; these entities combined are referred to here as a DTMF residual signal. The DTMF residual signal can be used to calculate a length-N feature vector, $F=[F_1, F_2, \ldots, F_N]$, $1 \leq n \leq N$, that are able characterize a device, device type, and/or relative geographic location to the call center. (A geographic location of a call may be a relative geographic location of a call, including relative to a call center, relative to a DTMF information processing unit (discussed below), or relative to an IVR system.) The individual features $F_n$ may be calculated as different statistical entities, such as a mean, a median, a variance, a standard deviation, a frequency, a wavelength, a duration, a coefficient of variation, or a percentile, and the statistical entities may be based on DTMF information.

As traditional PSTN traffic is converted to voice over IP (VOIP), DTMF tones generated by the device are often converted to an encoding format specified in RFC 4733 (and RFC 2833, which has been rendered obsolete by RFC 4733). This encoding format includes a payload with information including an event code, an end bit, volume, duration, etc. The conversion from a DTMF tone to the payload format in RFC 4733 removes almost all of the audible tone from the call, and replaces it with a human-readable value representing the digit or letter or symbol that was pressed. For DTMF, the event codes are a number from 0-15 (as distinct from a superimposition of two frequencies). An IVR system may simply read the DTMF information out of the payload, as opposed to, e.g., determining a frequency from an analog audio signal. However, since DTMF tone recognition may require several tens of milliseconds, the first few milliseconds of a digit may arrive as a regular audio packet, e.g. a Real-time Transport Protocol (RTP) audio packet. A DTMF residual signal may be determined from the audio packet, e.g., RTP packet. That is, embodiments described herein may be implemented on RFC 4733 encodings of DTMF events or on audio tones (e.g. analog audio signal) generated by the phone devices.

More modern devices like VOIP phones, smartphones, softphones, etc., do not operate the same way as early phones. Rather, the developers of these devices have chosen recordings of the tones to play over the call. Various factors of the chosen tone recording vary by vendor. In short, the creator of these devices had to choose a recording to use, and there is no standard. With that there is measurable variance in the tones generated by different manufacturers' devices. By tracking statistical information about the tone generated by a specific device type, DTMF interaction on the receiving end of a call can be attributed to those device types.

DTMF information may include a DTMF tone, an ideal DTMF tone, a DTMF residual signal, and/or an observed DTMF tone. DTMF information may include information encoded in a packet, such as an RTP packet, and/or information in a payload such as a payload specified in RFC 4733.

In at least one embodiment, statistics of the DTMF residual signals are calculated for each call, which form the feature vector describing that call. The feature vectors of a number of calls are then used to train classifier(s) for device type and geographical location. Feature vectors from future calls are passed through these classifiers in order to determine the call's origin in terms of device type and geography. Expected device type and geography are also obtained based on the phone number, and if the two estimates do not match, the call is assumed to be spoofed.

In at least one embodiment, DTMF residual signals are collected from the DTMF tones related to a given phone number. Feature vectors based on the statistics of the DTMF residual signals are calculated and are used to train a model. Feature vectors from future calls can be compared against the model in order to determine if the call is made from the same device.

In at least one embodiment, statistics about DTMF tones collected from a single device type are calculated, and a model is trained as a unique "fingerprint" for a device type. Future DTMF tones from a device are compared against the model to determine the probability that the device that generated the DTMF tone is of the same device type used to generate the "fingerprint".

In at least one embodiment, DTMF tones are collected from a given phone number. Statistics are generated for those DTMF tones, and a model is trained as a unique "fingerprint" that represents that phone number. Future DTMF tones collected from the same phone number are compared against the model to determine the probability that the device that generated the DTMF tones is from the same device type as the device type(s) used to generate the "fingerprint." This, effectively, allows for detection of spoofed phone calls. If one device type is used to generate the DTMF tones that are used to create the "fingerprint," and future DTMF tones are observed from the same calling phone number that do not match the "fingerprint," the call is assumed to have been made from a different device type and can be assumed spoofed.

In at least one embodiment, DTMF tones are collected from the device of a known user. The user is first required to authenticate by some means before entering some key presses for analysis. DTMF tones collected after authentication are used to train a model. As future calls are collected from that user, DTMF tones in the call are compared against the model as a means to authenticate the user. If the DTMF tones observed in calls subsequent to authentication are similar in nature to those collected prior, one can assume that the user is calling from the same device.

In at least one embodiment, a collection of known spoofed and genuine calls are collected. A model is trained on that data set to be able to generically detect spoofing. With that, by collecting a broad set of known spoofed and known genuine calls, future calls can be predicted as spoofed or not without building specific "fingerprints" for a party to a call, a device, or a phone number.

FIG. 1 is a block diagram illustrating a feature extraction process according to at least one embodiment. An audio signal s(n) (110) is received by a DTMF detection and analysis unit (115), which detects the DTMF in the audio signal (110) and analyzes the DTMF audio signal components to identify which of the sixteen value(s) (e.g. 0-9, #, *, and A, B, C, D) are in the audio signal (110). The audio signal (110) may be an analog audio signal or may be DTMF information including information encoded in a packet, such as an RTP packet, and/or information in a payload such as a payload specified in RFC 4733. The DTMF detection and analysis unit (115) detects a DTMF offset $\tau(k)$ (120) and a DTMF event (e.g. 0-9, #, *, and A, B, C, D) and/or duration (125). Based on the DTMF event and duration, a kth ideal DTMF tone $d_i(k)$ (145) is determined or generated (135). Based on the DTMF offset $\tau(k)$ (120) and the DTMF event and duration (125), a kth observed DTMF tone $d_o(k)$ (140) is determined or extracted (130) from the audio signal (110). The kth ideal DTMF tone (145) and the kth observed DTMF tone (140) are then used to determine an additive noise $\hat{e}(k)$ (155). Features $F_1, F_2, \ldots, F_N$, $1 \leq N$ may then be calculated (160) from the additive noise (155), and the calculation (160) provides feature vector F (165) of length N.

In at least one embodiment, at least one of the features $F_1$, $F_2, \ldots, F_N$, $1 \leq N$ may be calculated based on the estimated channel noise $\hat{h}_c(k)$ by using Wiener filtering with the ideal DTMF tone and the observed signal.

Figure 2:
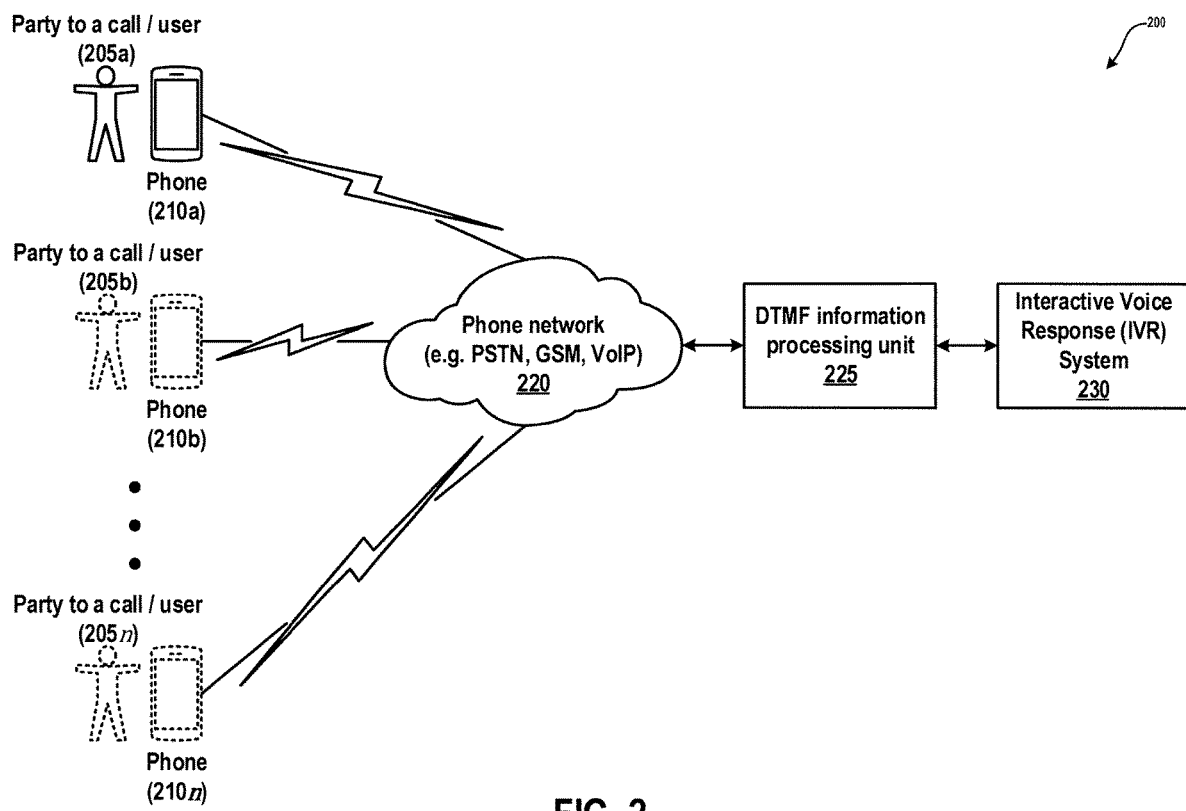
FIG. 2 is a block diagram illustrating a system for call classification through analysis of DTMF information and/or training a model for call classification through analysis of DTMF information according to at least one embodiment.

FIG. 2 is a block diagram illustrating a system (200) for call classification through analysis of DTMF information and/or training a model for call classification through analysis of DTMF information according to at least one embodiment. Party to a call (e.g. user) (205a) has a phone (e.g. telephone, smartphone, softphone, VOIP phone, POTS landline, etc.) (210) which provides DTMF information (215) through phone network (220) to the DTMF information processing unit (225). The phone network (220) may comprise a PSTN network, a GSM network, and/or a VOIP network. DTMF information (215) may also pass through the phone network (220) to an IVR system (230). The DTMF information processing unit (225) may be a part of the IVR system (230) or may be remote to the IVR system (230) and connected via, for example, a network. The DTMF information processing unit (225) and the IVR system (230) may exchange information according to the methods disclosed herein. The DTMF information processing unit (225) of FIG. 2 may be the DTMF information processing unit (300) of FIG. 3.

In at least one embodiment, the system (200) may train a model for call classification through analysis of DTMF information (215). In at least one embodiment, the model may be based on DTMF information (215) from n users such that user (205b) having phone (210b) up to user (205n) having phone (210n) provide DTMF information (215) which is a basis for training a model for call classification.

Figure 3:
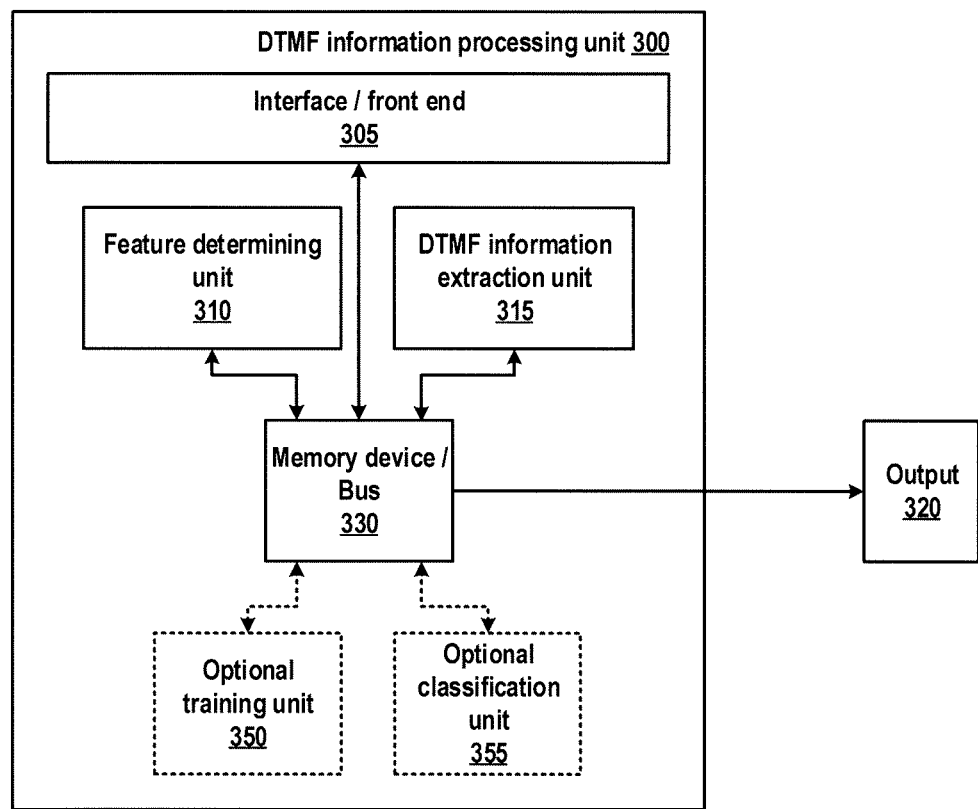
FIG. 3 is a block diagram illustrating a DTMF information processing unit according to at least one embodiment.

FIG. 3 is a block diagram illustrating a DTMF information processing unit (300) according to at least one embodiment. The DTMF information processing unit (300) of FIG. 3 may be the DTMF information processing unit (225) of FIG. 2. DTMF information processing unit (300) may include an interface/front end (305), a feature determining unit (310), a DTMF information extraction unit (315), output (320), and a memory device/bus (330). DTMF information processing unit (300) may optionally include an optional training unit (350). DTMF information processing unit (300) may optionally include an optional classification unit (355).

The DTMF information processing unit (300) receives DTMF information from a party to a call (e.g. user) (205a), (205b), ..., and/or (205n) via a phone network (220). The DTMF information processing unit (300) provides an output (320). The output (320) may be a classification of a call. The output (320) may be a model, including a model trained or learned by the optional training unit (350). The call classification may be a device type, a specific device, a user, whether the call is genuine or spoofed, that the call should or should not be authenticated, a probability of a call classification, a geographic location, a relative geographic location, whether the call is from a same device or a different device relative to a device of prior calls, etc. The output (320) may be displayed on a display. The classification of the call may be done during the call. The output may be displayed on the display during the call.

The feature determining unit (310) determines features from the DTMF information. A feature vector may comprise a set of features pertaining to call. The feature determining unit (310) may determine a feature vector including one or more features. A feature may be based on an ideal DTMF tone, channel noise, additive noise, a device type, a specific device, a relative geographic location, a geographic location, whether the call is genuine, whether the call is spoofed, a probability, a user identity, a user name, an account number, a phone number, a DTMF residual signal, etc. A feature may be based on DTMF information. A feature may be based on a statistic such as a mean, a median, a variance, a standard deviation, a frequency, a wavelength, a duration, a coefficient of variation, or a percentile. A feature may be based on a mean, a median, a variance, a standard deviation, a frequency, a wavelength, a duration, a coefficient of variation, or a percentile of DTMF information. The feature determining unit (310) may implement the feature extraction process of FIG. 1. The feature determining unit (310) may provide features or feature vectors to the memory device/bus (330).

The DTMF information extraction unit (315) extracts DTMF information from a call. The DTMF information extraction unit (315) may extract an observed DTMF tone from an analog audio signal or from an audio packet, e.g., RTP packet. The DTMF information extraction unit (315) may extract DTMF information from a payload (e.g. RTP payload or payload specified in RFC 4733 or RFC 2833) including an event code, an end bit, volume, duration, etc. The DTMF information extraction unit (315) may provide DTMF information to the memory device/bus (330).

The optional training unit (350) may receive feature vectors associated with calls and train or learn a model. The model may be a machine learning model. The model may be a classifier. Each feature vector may be associated with a label. The label may be a classification which the model will learn to provide as output when the model is used as a classifier for classification of calls. The label may be whether the call is genuine or spoofed, a device type, a phone number, a specific device, a relative geographic location, a geographic location, a probability, whether a call should be authenticated, a user name, an identity, an account number, etc. An ensemble of models may be used via boosting or another ensemble method. A person having ordinary skill in the art will recognize the model may be any one of many methods for classification or regression known in the art. The model may be an artificial neural network, a Bayesian graphical model, a Gaussian process, a logistic regression, a support vector machine, a decision tree, a hidden Markov model, or k-nearest neighbor. K-fold cross-validation may be used. The optional training unit (350) may provide the model to the memory device/bus (330).

The optional classification unit (355) classifies calls by comparing a feature vector associated with a call to the model. The model may be a model trained by the optional training unit (350). The optional classification unit (355) may provide the output (320). Instead of a comparing a feature vector to a model, the optional classification unit (355) may use an unsupervised learning method such as clustering or hierarchical clustering to classify a feature vector. The optional classification unit (355) may provide the classification or output (320) to the memory device/bus (330).

Note the training unit (350) is optional. Clustering may be used for classification, and a kernel may be selected. The kernel may be selected to find an improved feature space that provides a desired separation of classifications. A relative locality measure may be used to select the kernel or feature space. Approximation methods such as a Nyström method or a random Fourier features method may be used to improve the computational complexity of the learning and/or classification process(es).

The memory device/bus (330) may comprise a system bus, memory bus, volatile storage, and/or non-volatile storage. Further, the memory device/bus (330) may comprise a bus connecting multiple computers. The memory device/bus may connect computers via a network or Internet connection. That is, the various components in the DTMF information processing unit (300) may be part of a distributed computing system, and the memory device/bus (330) may connect the various components in the distributed computing system. Thus, the memory device/bus (330) may include a network connection and equipment such as routers, gateways, network adapters, etc., to enable the various components of the DTMF information processing unit (300) to communicate and perform methods, including the methods described herein. The memory device/bus (330) communicates information between various portions of the DTMF information processing unit (300), including the interface/front end (305). The memory device/bus (330) may provide the output (320) to e.g. a user, an IVR, a display, or the interface/front end (305).

In at least one embodiment, an IVR call flow may be altered based on an output (320) or a classification. For example, if a call is determined to be spoofed or from a predetermined phone number, the IVR call flow may direct the call to an investigation department to investigate fraud. On the other hand, if the call is determined to be genuine, the IVR may deem the call or the party to the call authenticated, and may report to the party to the call that the call is authenticated.

Figure 4:
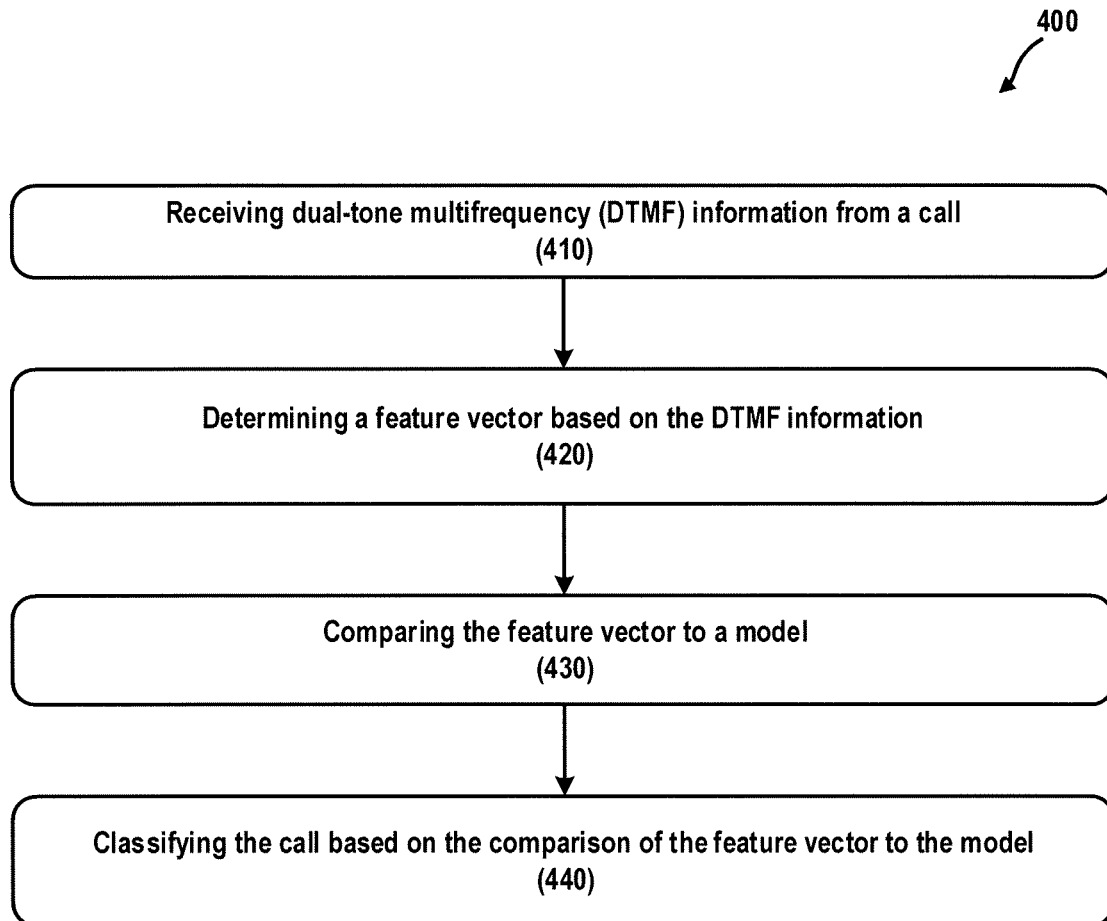
FIG. 4 is a flow diagram of an example computer-implemented method to classify a call.

FIG. 4 is a flow diagram of an example computer-implemented method (400) to classify a call. First, dual-tone multifrequency (DTMF) information from a call is received (410). Second, a feature vector is determined (420) based on the DTMF information. Third, the feature vector is compared (430) to a model. Fourth, the call is classified (440) based on the comparison of the feature vector to the model.

Figure 5:
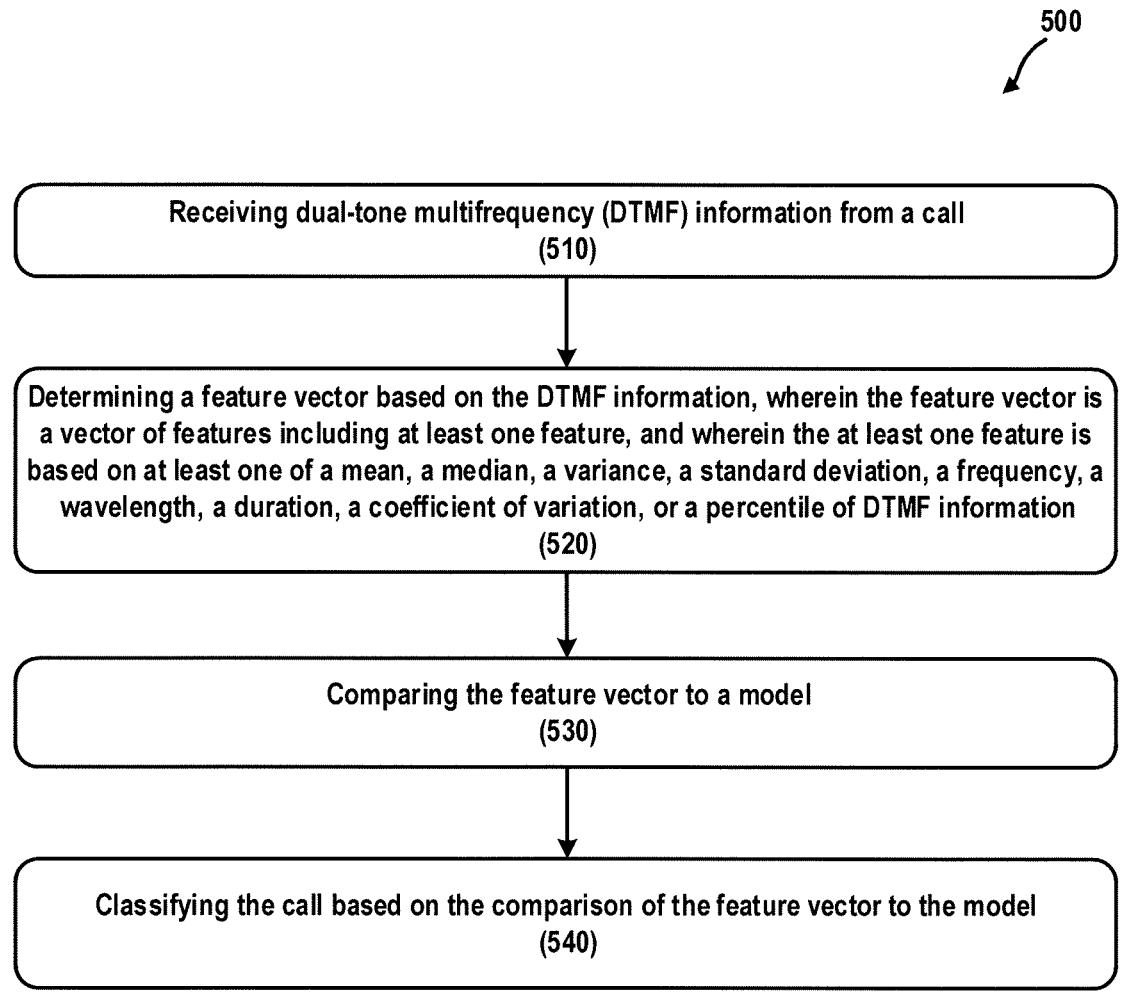
FIG. 5 is a flow diagram of an example computer-implemented method to classify a call.

FIG. 5 is a flow diagram of an example computer-implemented method (500) to classify a call. First, dual-tone multifrequency (DTMF) information from a call is received (510). Second, a feature vector is determined (520) based on the DTMF information, wherein the feature vector is a vector of features including at least one feature, and wherein the at least one feature is based on at least one of a mean, a median, a variance, a standard deviation, a frequency, a duration, a coefficient of variation, or a percentile of DTMF information. Third, the feature vector is compared (530) to a model. Fourth, the call is classified (540) based on the comparison of the feature vector to the model.

Figure 6:
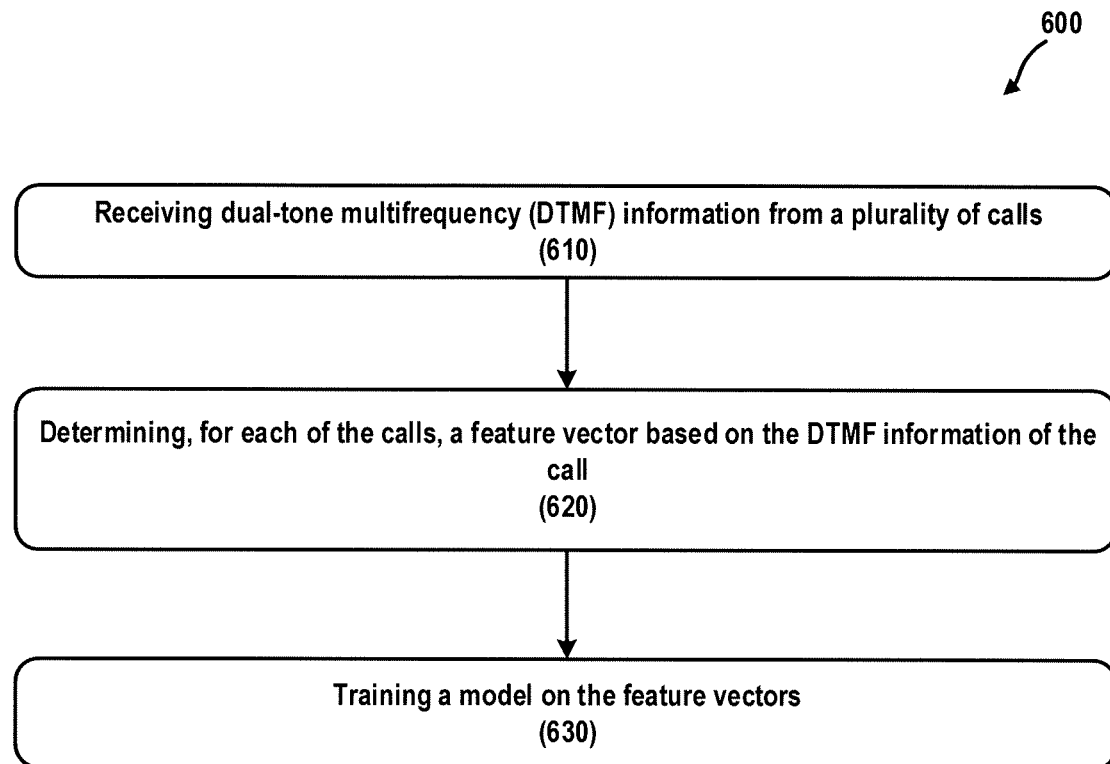
FIG. 6 is a flow diagram of an example computer-implemented method to train a model for call classification.

FIG. 6 is a flow diagram of an example computer-implemented method (600) to train a model for call classification. First, dual-tone multifrequency (DTMF) information is received (610) from a plurality of calls. Second, for each of the calls, a feature vector based on the DTMF information of the call is determined (620). Third, a model is trained (630) on the feature vectors.

Figure 7:
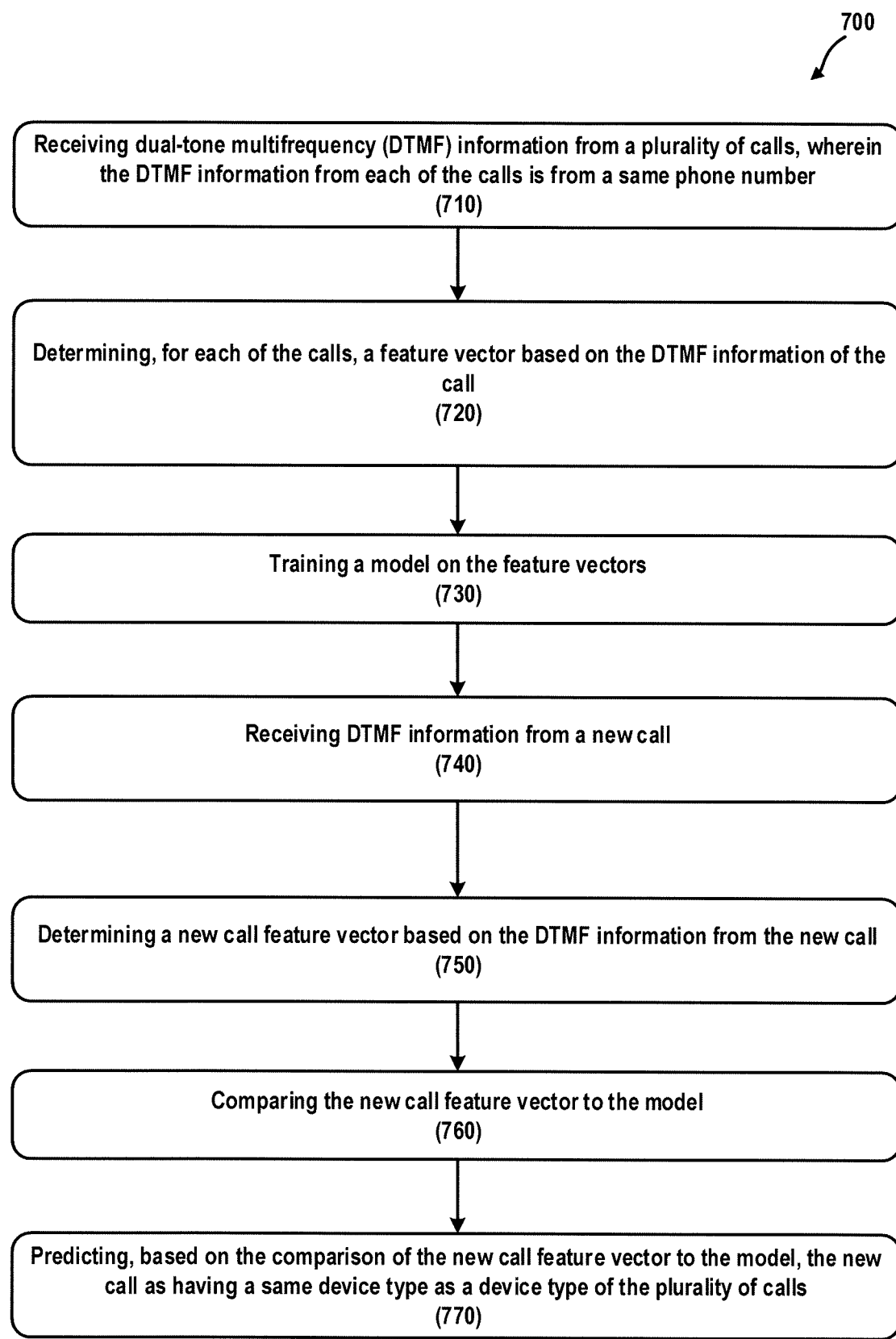
FIG. 7 is a flow diagram of an example computer-implemented method to train a model for call classification.

FIG. 7 is a flow diagram of an example computer-implemented method (700) to train a model for call classification. First, dual-tone multifrequency (DTMF) information is received (710) from a plurality of calls, wherein the DTMF information from each of the calls is from a same phone number. Second, for each of the calls, a feature vector based on the DTMF information of the call is determined (720). Third, a model is trained (730) on the feature vectors. Fourth, DTMF information from a new call is received (740). Fifth, a new call feature vector is determined (750) based on the DTMF information from the new call. Sixth, the new call feature vector is compared (760) to the model. Seventh, based on the comparison of the new call feature vector to the model, the new call is predicted (770) as having a same device type as a device type of the plurality of calls.

Figure 8:
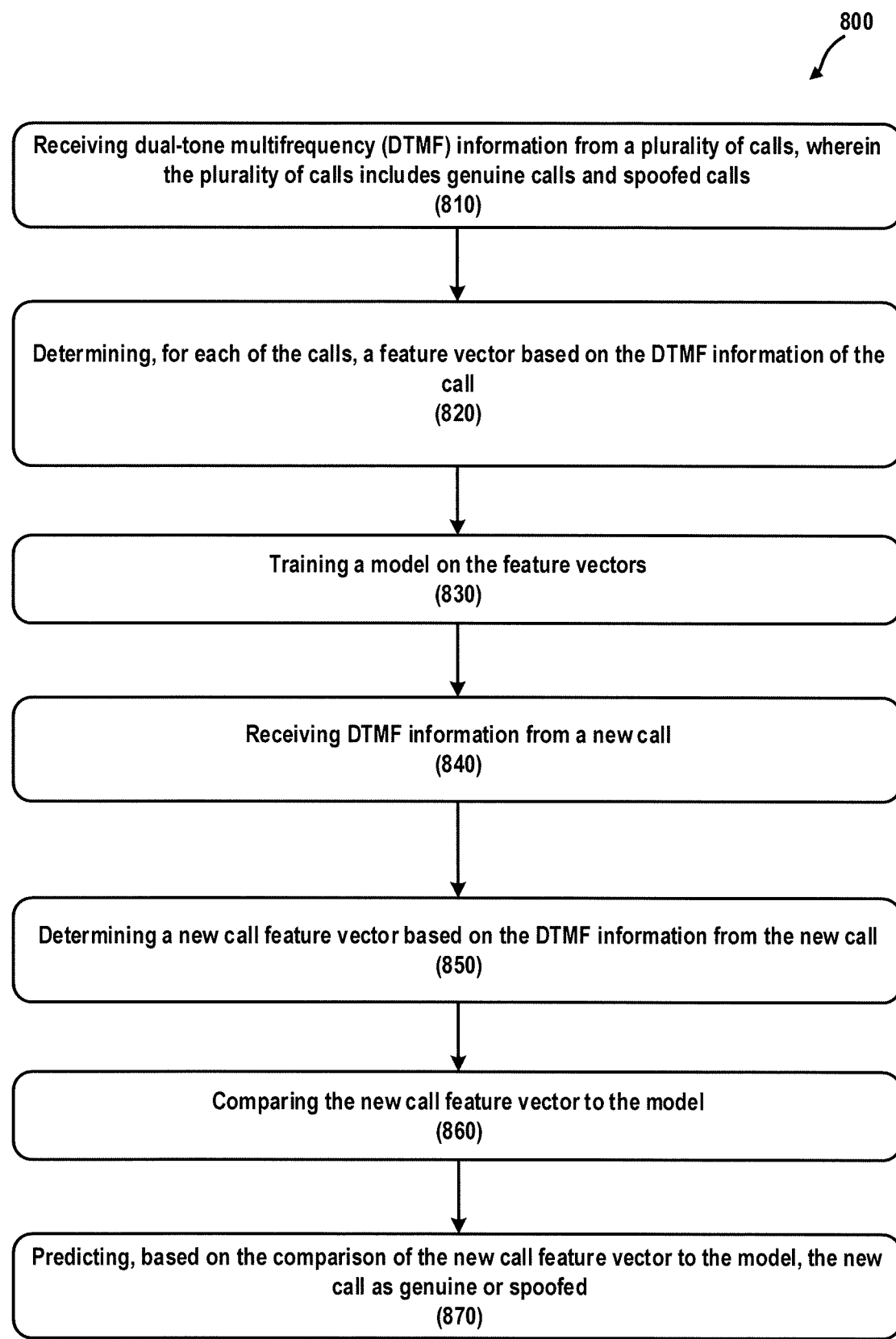
FIG. 8 is a flow diagram of an example computer-implemented method to train a model for call classification.

FIG. 8 is a flow diagram of an example computer-implemented method (800) to train a model for call classification. First, dual-tone multifrequency (DTMF) information is received (810) from a plurality of calls, wherein the plurality of calls includes genuine calls and spoofed calls. Second, for each of the calls, a feature vector based on the DTMF information of the call is determined (820). Third, a model is trained (830) on the feature vectors. Fourth, DTMF information from a new call is received (840). Fifth, a new call feature vector is determined (850) based on the DTMF information from the new call. Sixth, the new call feature vector is compared (860) to the model. Seventh, based on the comparison of the new call feature vector to the model, the new call is predicted (870) as genuine or spoofed.

Figure 10:
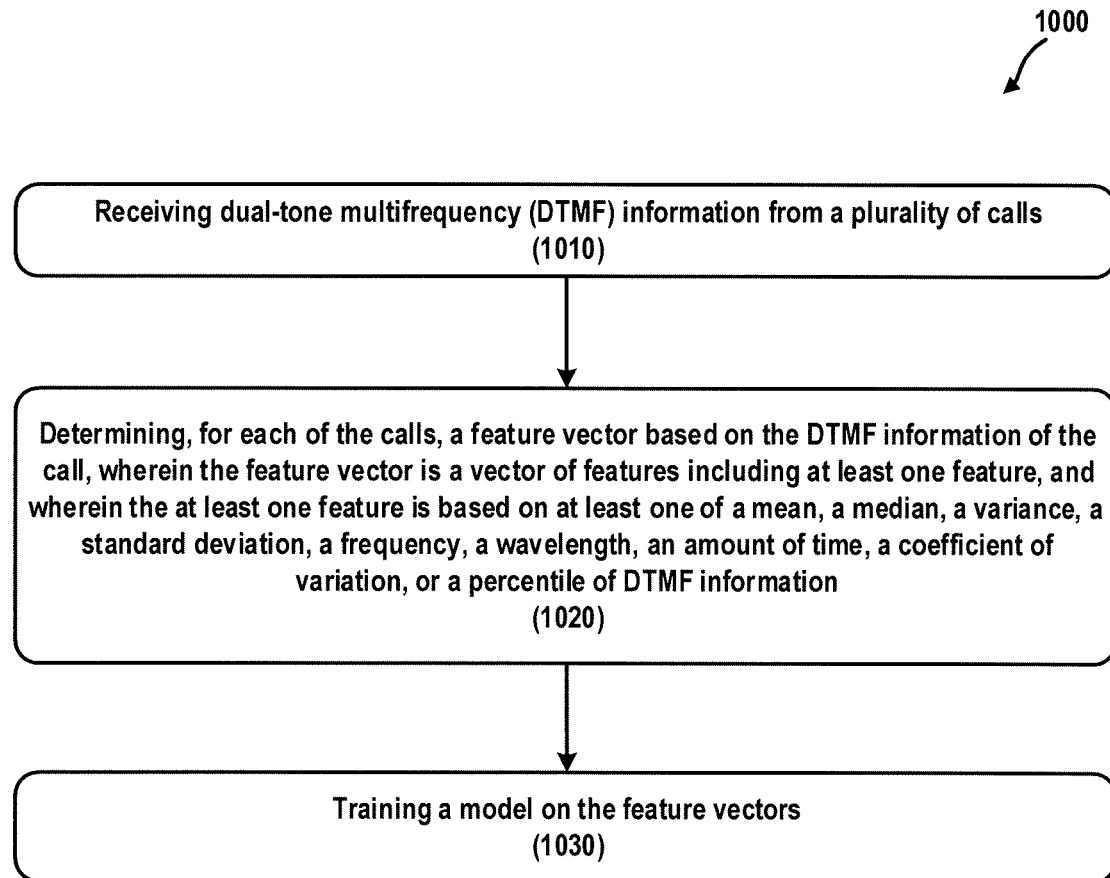
FIG. 10 is a flow diagram of an example computer-implemented method to train a model for call classification.

FIG. 10 is a flow diagram of an example computer-implemented method (1000) to train a model for call classification. First, dual-tone multifrequency (DTMF) information is received (1010) from a plurality of calls. Second, for each of the calls, a feature vector based on the DTMF information of the call is determined (1020), wherein the feature vector is a vector of features including at least one feature, and wherein the at least one feature is based on at least one of a mean, a median, a variance, a standard deviation, a frequency, a wavelength, an amount of time, a coefficient of variation, or a percentile of DTMF information. Third, a model is trained (1030) on the feature vectors.

Figure 11:
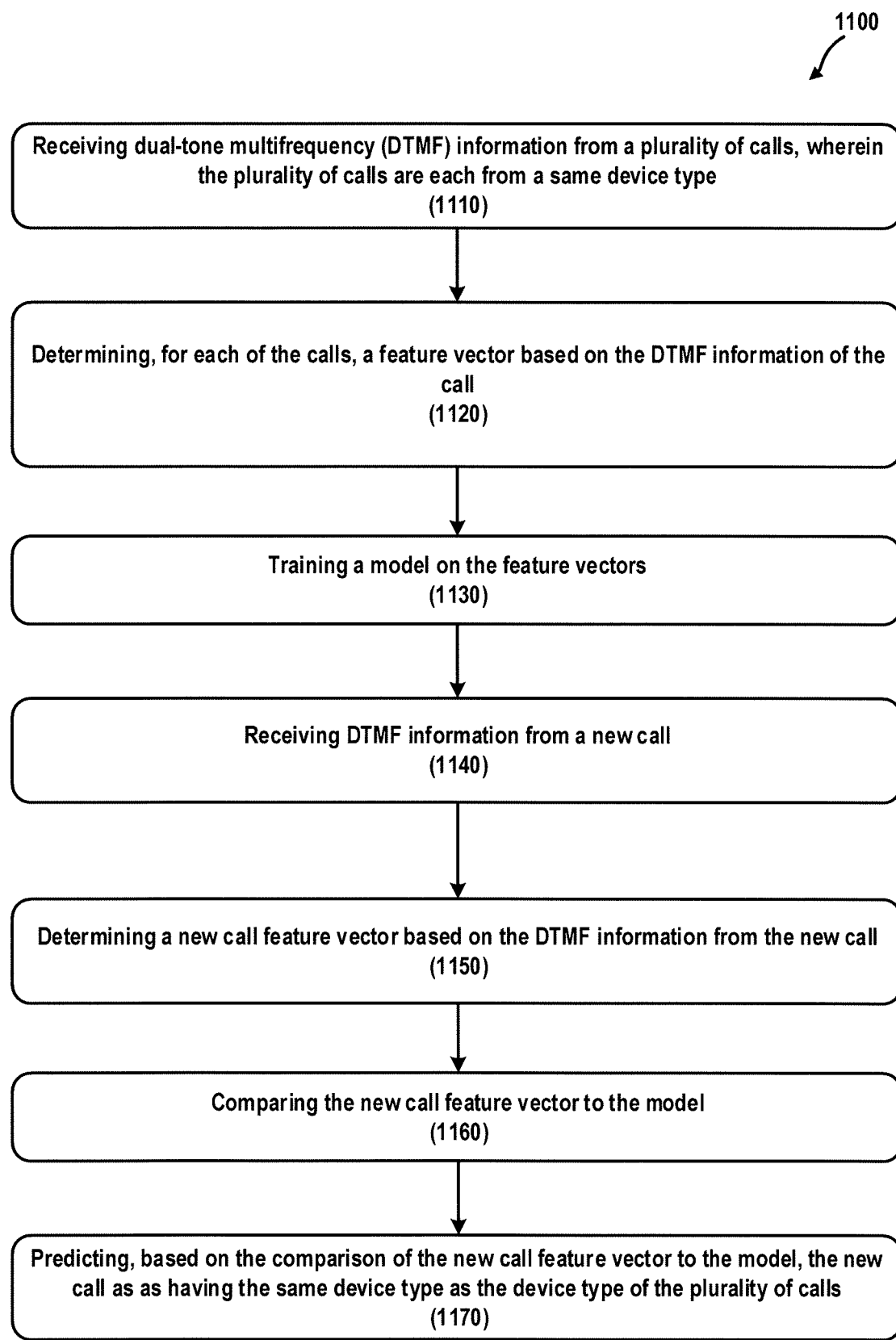
FIG. 11 is a flow diagram of an example computer-implemented method to train a model for call classification.

FIG. 11 is a flow diagram of an example computer-implemented method (1100) to train a model for call classification. First, dual-tone multifrequency (DTMF) information is received (1110) from a plurality of calls, wherein the plurality of calls are each from a same device type. Second, for each of the calls, a feature vector based on the DTMF information of the call is determined (1120). Third, a model is trained (1130) on the feature vectors. Fourth, DTMF information from a new call is received (1140). Fifth, a new call feature vector is determined (1150) based on the DTMF information from the new call. Sixth, the new call feature vector is compared (1160) to the model. Seventh, based on the comparison of the new call feature vector to the model, the new call is predicted (1170) as having the same device type as the device type of the plurality of calls.

Figure 12:
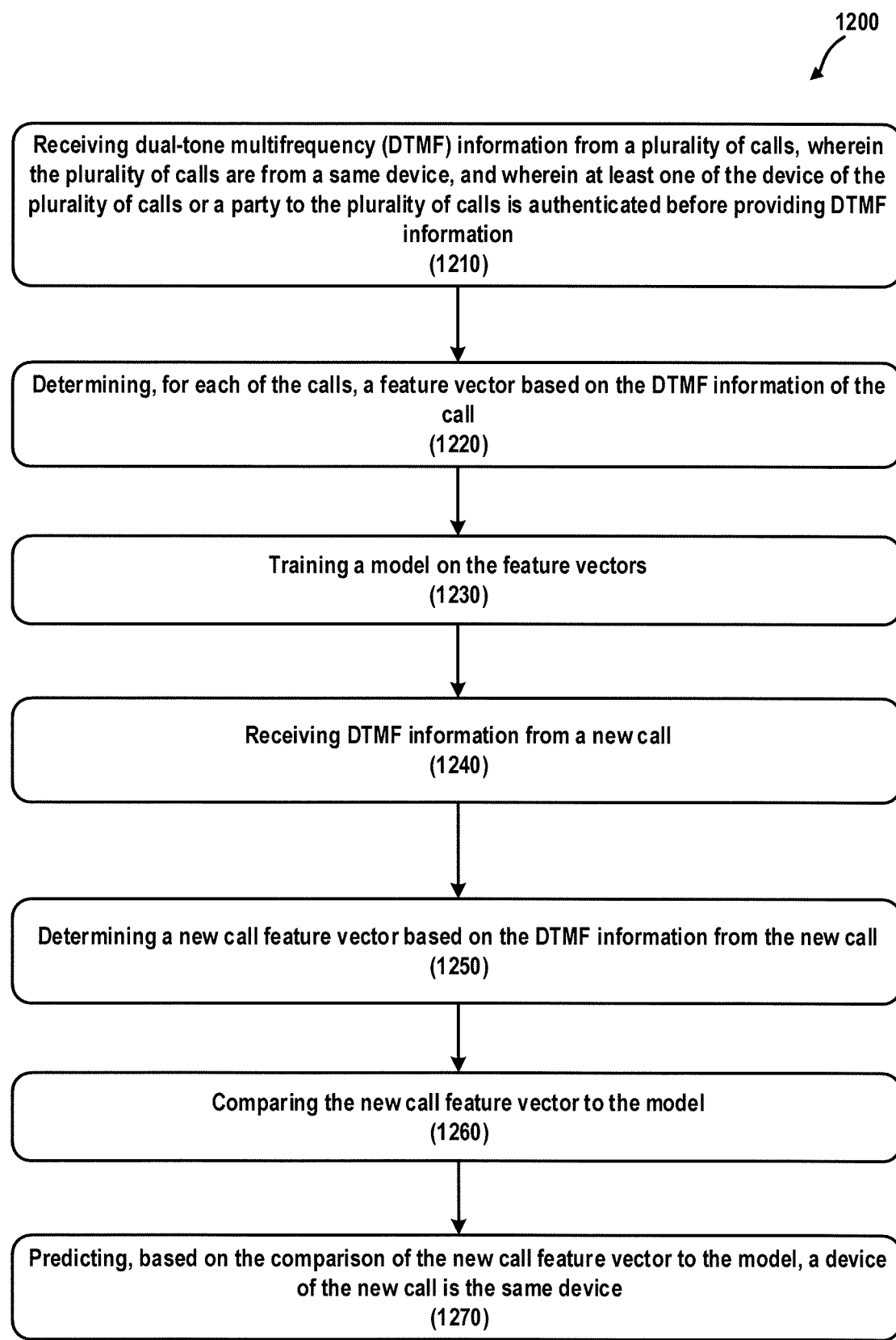
FIG. 12 is a flow diagram of an example computer-implemented method to train a model for call classification.

FIG. 12 is a flow diagram of an example computer-implemented method (1200) to train a model for call classification. First, dual-tone multifrequency (DTMF) information is received (1210) from a plurality of calls, wherein the plurality of calls are from a same device, and wherein at least one of the device of the plurality of calls or a party to the plurality of calls is authenticated before providing DTMF information. Second, for each of the calls, a feature vector based on the DTMF information of the call is determined (1220). Third, a model is trained (1230) on the feature vectors. Fourth, DTMF information from a new call is received (1140). Fifth, a new call feature vector is determined (1150) based on the DTMF information from the new call. Sixth, the new call feature vector is compared (1160) to the model. Seventh, based on the comparison of the new call feature vector to the model, a device of the new call is predicted to be the same device. (That is, the device of the new call is predicted to be the same device of the plurality of calls.)

Figure 13:
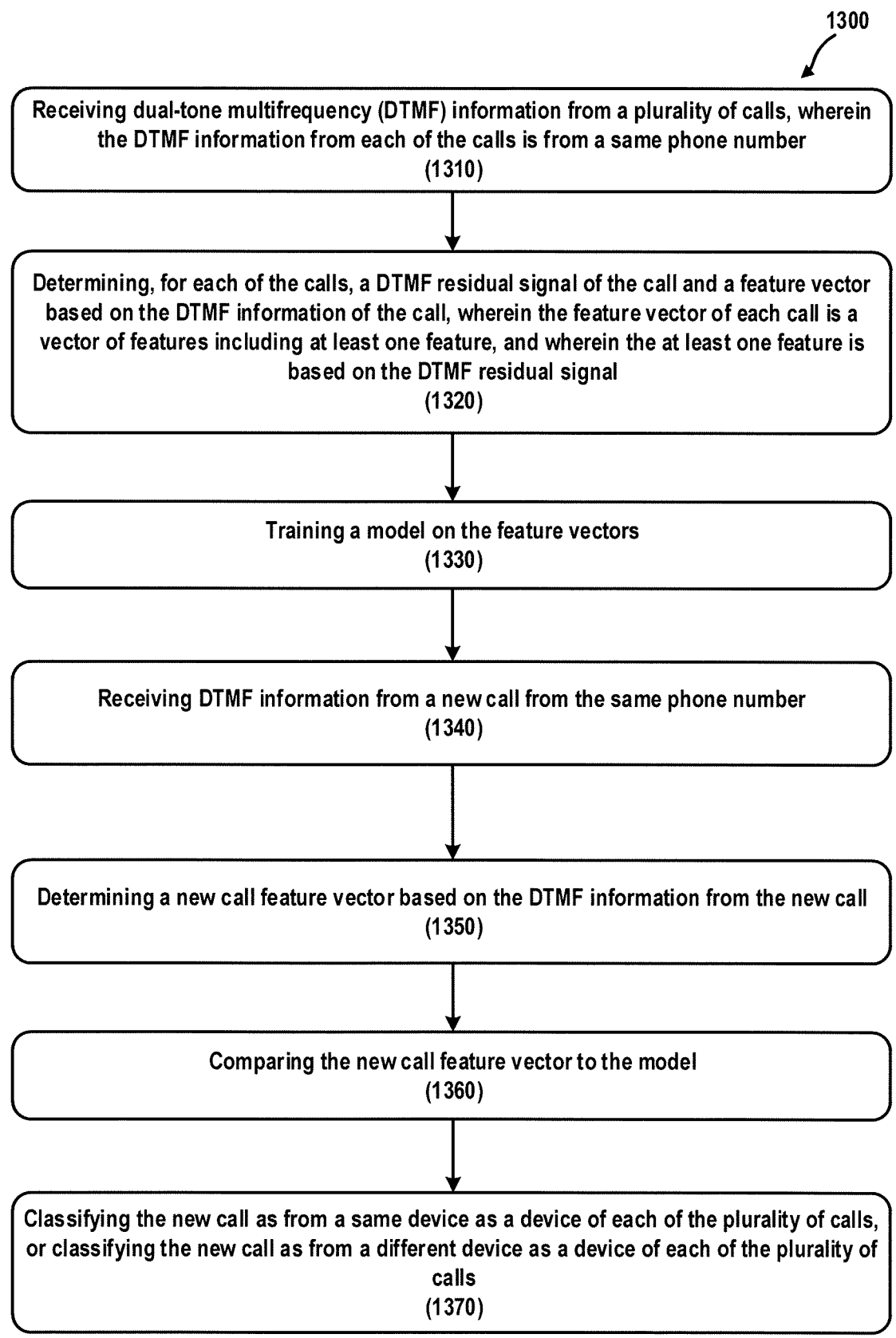
FIG. 13 is a flow diagram of an example computer-implemented method to train a model for call classification.

FIG. 13 is a flow diagram of an example computer-implemented method (1300) to train a model for call classification. First, dual-tone multifrequency (DTMF) information is received (1310) from a plurality of calls, wherein the DTMF information from each of the calls is from a same phone number. Second, for each of the calls, a DTMF residual signal of the call and a feature vector based on the DTMF information of the call is determined (1320), wherein the feature vector of each call is a vector of features including at least one feature, and wherein the at least one feature is based on the DTMF residual signal. Third, a model is trained (1330) on the feature vectors. Fourth, DTMF information from a new call from the same phone number is received (1340). Fifth, a new call feature vector is determined (1350) based on the DTMF information from the new call. Sixth, the new call feature vector is compared (1360) to the model. Seventh, the new call is classified (1370) as from a same device as a device of each of the plurality of calls, or the new call is classified (1370) as from a different device as a device of each of the plurality of calls.

Figure 14:
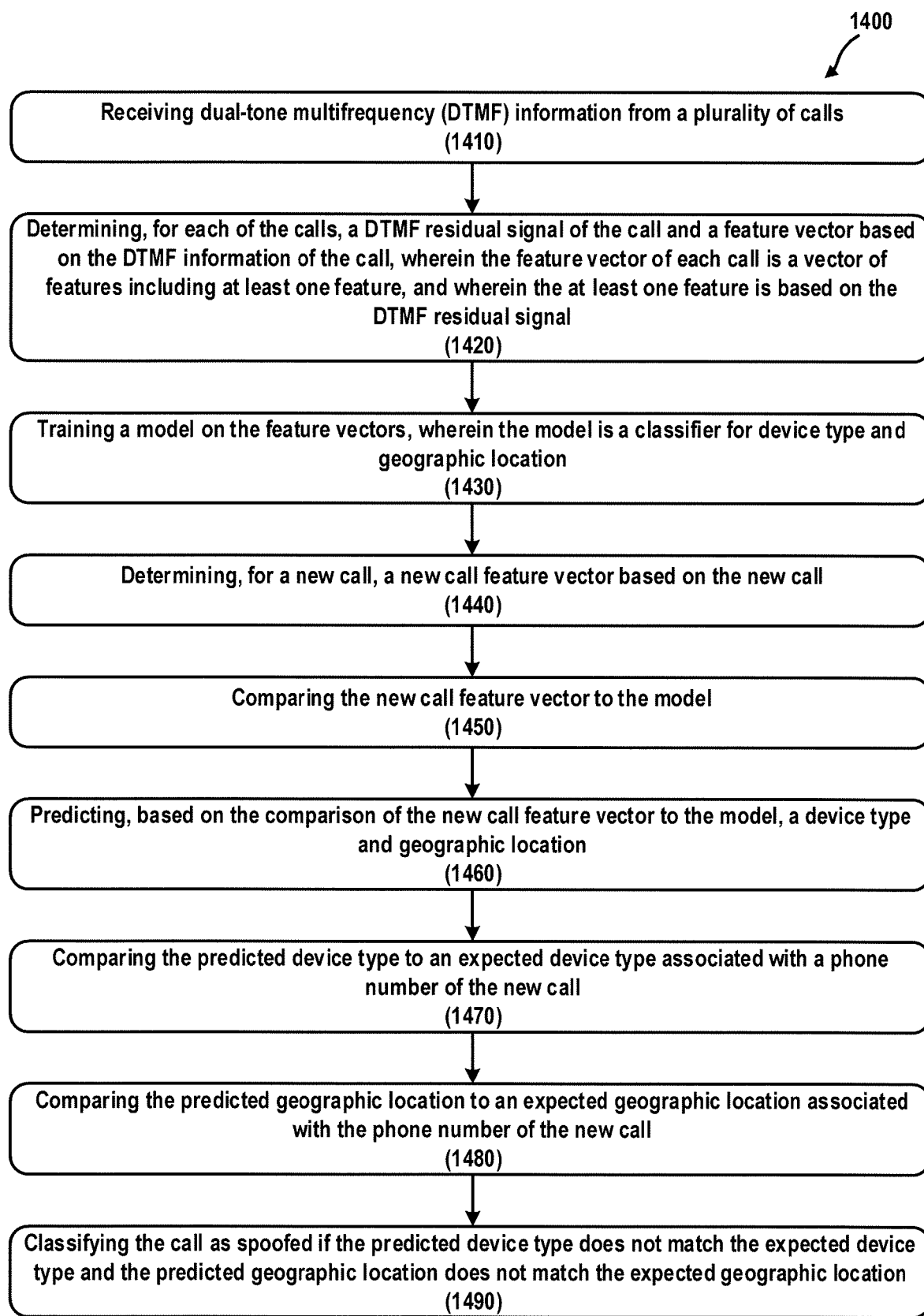
FIG. 14 is a flow diagram of an example computer-implemented method to train a model for call classification.

FIG. 14 is a flow diagram of an example computer-implemented method (1400) to train a model for call classification. First, dual-tone multifrequency (DTMF) information is received (1410) from a plurality of calls. Second, for each of the calls, a DTMF residual signal of the call and a feature vector based on the DTMF information of the call is determined (1420), wherein the feature vector of each call is a vector of features including at least one feature, and wherein the at least one feature is based on the DTMF residual signal. Third, a model is trained (1430) on the feature vectors, wherein the model is a classifier for device type and geographic location. Fourth, for a new call, a new call feature vector is determined (1440) based on the new call. Fifth, the new call feature vector is compared (1450) to the model. Sixth, based on the comparison of the new call feature vector to the model, a device type and geographic location are predicted (1460). Seventh, the predicted device type is compared (1470) to an expected device type associated with a phone number of the new call. Eighth, the predicted geographic location is compared (1480) to an expected geographic location associated with the phone number of the new call. Ninth, the call is classified (1490) as spoofed if the predicted device type does not match the expected device type and the predicted geographic location does not match the expected geographic location.

An expected geographic location may be, without limitation, a geographic location associated with a fact or information or a record (e.g. in a database). For example, if a geographic location is associated with a device, a device type, a phone number, a user, or other identifying information, the geographic location may be an expected geographic location with respect to the identifying information when the identifying information is next encountered (e.g. in a call).

An expected device type may be, without limitation, a device type associated with a fact or information or a record (e.g. in a database). For example, if a device type is associated with a device, a geographic location, a phone number, a user, or other identifying information, the device type may be an expected device type with respect to the identifying information when the identifying information is next encountered (e.g. in a call).

Authentication may be sufficient condition to allow a user to access a user profile or to grant a user access or permission. A duration may be an amount of time. An amount of time may be a duration. Predicting may include estimating a probability. As used herein, a device having different software or a different state in physical memory from one point in time to another point in time is still the "same device" at both points in time.

Figure 9:
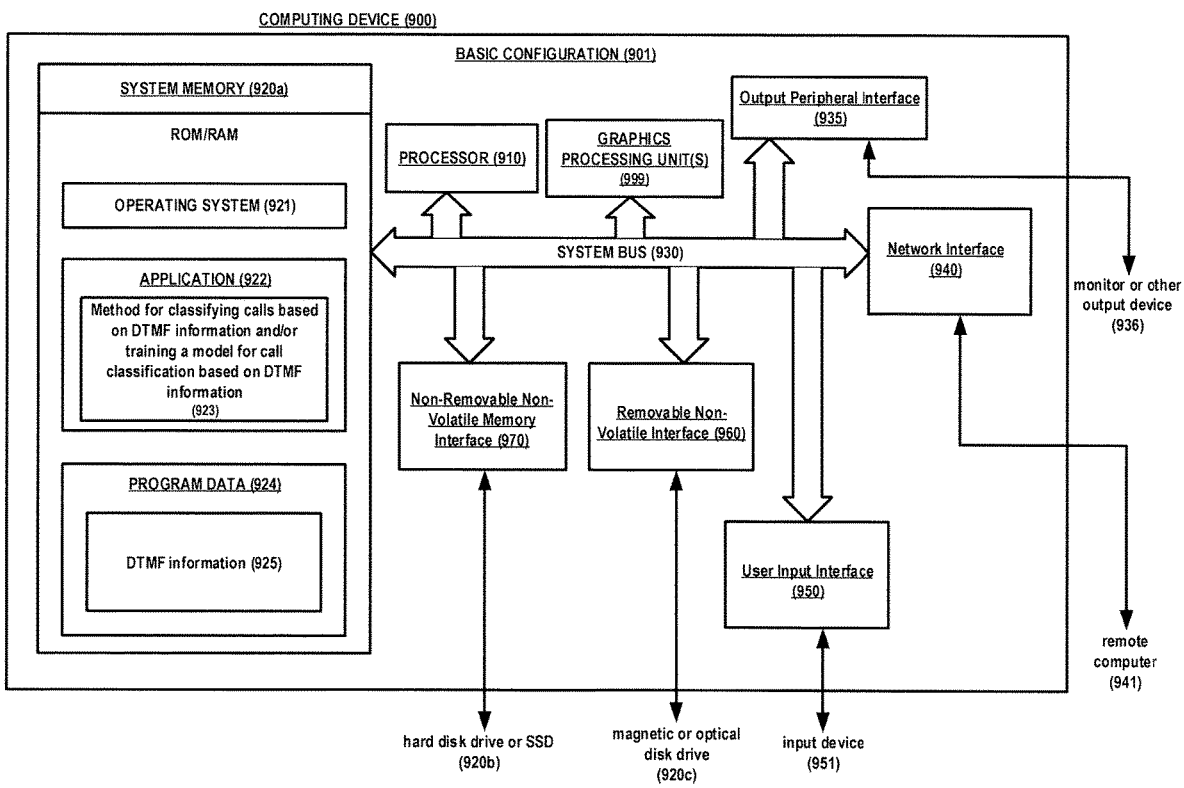
FIG. 9 is a block diagram illustrating an example computing device.

FIG. 9 is a high-level block diagram of an example computer (900) that is arranged for a method for classifying calls based on DTMF information and/or training a model for call classification based on DTMF information. In a very basic configuration (901), the computing device (900) typically includes one or more processors (910) and system memory (920*a*). A system bus (930) can be used for communicating between the processor (910) and the system memory (920*a*).

Depending on the desired configuration, the processor (910) can be of any type including but not limited to a microprocessor (μP), a microcontroller (μC), a digital signal processor (DSP), or any combination thereof. The processor (910) can include one more levels of caching, a processor core, and registers. The processor core can include an arithmetic logic unit (ALU), a floating point unit (FPU), a digital signal processing core (DSP Core), or the like, or any combination thereof. A memory controller can also be used with the processor (910), or in some implementations the memory controller can be an internal part of the processor (910).

Depending on the desired configuration, the system memory (920*a*) can be of any type including but not limited to volatile memory (such as RAM), non-volatile memory (such as ROM, flash memory, etc.) or any combination thereof. System memory (920*a*) typically includes an operating system (921), one or more applications (922), and program data (924). The application (922) may include a method for classifying calls based on DTMF information and/or training a model for call classification based on DTMF information. Program data (924) includes storing instructions that, when executed by the one or more processing devices, implement a system and method for classifying calls based on DTMF information and/or training a model for call classification based on DTMF information (923). In some embodiments, the application (922) can be arranged to operate with program data (924) on an operating system (921). Program data (924) may include DTMF information (925).

The computing device (900) can have additional features or functionality, and additional interfaces to facilitate communications between the basic configuration (901) and any required devices and interfaces, such non-removable non-volatile memory interface (970), removable non-volatile interface (960), user input interface (950), network interface (940), and output peripheral interface (930). A hard disk drive or SSD (920*b*) may be connected to the system bus (930) through a non-removable non-volatile memory interface (970). A magnetic or optical disk drive (920*c*) may be connected to the system bus (930) by the removable non-volatile interface (960). A user of the computing device (900) may interact with the computing device (900) through input devices (951) such as a keyboard, mouse, or other input peripheral connected through a user input interface (950). A monitor or other output peripheral device (936) may be connected to the computing device (900) through an output peripheral interface (935) in order to provide output from the computing device (900) to a user or another device.

System memory (920*a*) is an example of computer storage media. Computer storage media includes, but is not limited to, RAM, ROM, EEPROM, flash memory or other memory technology, CD-ROM, digital versatile disk (DVD), Blu-ray Disc (BD) or other optical storage, magnetic cassettes, magnetic tape, magnetic disk storage or other magnetic storage devices, or any other medium which can be used to store the desired information and which can be accessed by computing device (900). Any such computer storage media can be part of the device (900). One or more graphics processing units (GPUs) (999) may be connected to the system bus (930) to provide computing capability in coordination with the processor (910), including when single instruction, multiple data (SIMD) problems are present.

The computing device (900) may be implemented in an integrated circuit, such as a microcontroller or a system on a chip (SoC), or it may be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that includes any of the above functions. In addition, the computing device (900) may be implemented as a personal computer including both laptop computer and non-laptop computer configurations, one or more servers, Internet of Things systems, and the like. Additionally, the computing device (900) may operate in a networked environment where it is connected to one or more remote computers (941) over a network using the network interface (950).

Those having ordinary skill in the art recognize that some of the matter disclosed herein may be implemented in software and that some of the matter disclosed herein may be implemented in hardware. Further, those having ordinary skill in the art recognize that some of the matter disclosed herein that may be implemented in software may be implemented in hardware and that some of the matter disclosed herein that may be implemented in hardware may be implemented in software. As used herein, "implemented in hardware" includes integrated circuitry including an application-specific integrated circuit (ASIC), a field programmable gate array (FPGA), a digital signal processor (DSP), an audio coprocessor, and the like.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. Those skilled in the art will appreciate that the mechanisms of the subject matter described herein are capable of being distributed as a program product in a variety of forms, and that an illustrative embodiment of the subject matter described herein applies regardless of the type of non-transitory signal bearing medium used to carry out the distribution. Examples of a non-transitory signal bearing medium include, but are not limited to, the following: a recordable type medium such as a floppy disk, a hard disk drive, a solid state drive (SSD), a Compact Disc (CD), a Digital Video Disk (DVD), a Blu-ray disc (BD), a digital tape, a computer memory, etc.

With respect to the use of substantially any plural and/or singular terms herein, those having ordinary skill in the art can translate from the plural to the singular and/or from the singular to the plural as is appropriate to the context and/or application. The various singular/plural permutations may be expressly set forth herein for sake of clarity.

Embodiments of the subject matter have been described. Other embodiments are within the scope of the following claims. In some cases, the actions recited in the claims can be performed in a different order and still achieve desirable results. In addition, the processes depicted in the accompanying figures do not necessarily require the order shown, or sequential order, to achieve desirable results. In certain implementations, multitasking and parallel processing may be advantageous.

What is claimed is:

1. A computer-implemented method compromising:
   receiving, by a computer, a dual tone multi frequency (DTMF) tone associated with a phone call;
   generating, by the computer, an ideal DTMF tone corresponding to the received DTMF tone, wherein the ideal DTMF tone is noise-free;
   estimating, by the computer, additive noise in the received DTMF tone based on the difference between the received DTMF tone and the ideal DTMF tone;
   generating, by the computer, a feature vector based upon the additive noise; and
   executing, by the computer, a machine learning model on a difference between the received DTMF tone and the ideal DTMF tone to classify the phone call, wherein executing the machine learning model comprises feeding, by the computer, the feature vector to the machine learning model.

2. The computer-implemented method of claim 1, further comprising:
   generating, by the computer, a feature vector based on the difference between the received DTMF tone and the ideal DTMF tone; and
   wherein executing the machine learning model comprises:
   feeding, by the computer, the feature vector to the machine learning model.

3. The computer-implemented method of claim 1, wherein the computer classifies the phone call as fraudulent or non-fraudulent.

4. The computer-implemented method of claim 1, wherein the received DTMF tone is received as an analog audio signal.

5. The computer-implemented method of claim 1, wherein the received DTMF tone is received as an audio packet.

6. The computer-implemented method of claim 5, wherein the audio packet is a Real-time Transport Protocol (RTP) audio packet.

7. The computer-implemented method of claim 1, further comprising:
   receiving, by the computer, a plurality of DTMF tones associated with a plurality of phone calls;
   generating, by the computer, a plurality of feature vectors based on the differences between each of the plurality of DTMF tones and an ideal DTMF tone; and
   training, by the computer, the machine learning model on the plurality of feature vectors.

8. A computer-implemented method of claim 1, further comprising:
   receiving, by a computer, a dual tone multi frequency (DTMF) tone associated with a phone call;
   generating, by the computer, an ideal DTMF tone corresponding to the received DTMF tone, wherein the ideal DTMF tone is noise-free;
   estimating, by the computer, channel noise in the received DTMF tone based on the difference between the received DTMF tone and the ideal DTMF tone;
   generating, by the computer, a feature vector based upon the channel noise; and
   executing, by the computer, a machine learning model on a difference between the received DTMF tone and the ideal DTMF tone to classify the phone call, wherein executing the machine learning model comprises:
feeding, by the computer, the feature vector to the machine learning model.

9. The computer-implemented method of claim 1, wherein the computer is associated with an Interactive Voice Response (IVR) system and the DTMF is received in response to IVR prompts.

10. A system comprising:
a non-transitory storage medium storing a plurality of computer program instructions;
a processor electrically coupled to the non-transitory storage medium and configured to execute the plurality of computer program instructions to:
receive a first dual tone multi frequency (DTMF) tone associated with a first phone call originating from a phone number;
generate a first feature vector from the first DTMF tone;
receive a second DTMF tone associated with a second phone call originating from the phone number;
generate a second feature vector from the second DTMF tone; and
execute a machine learning model that is based on the first feature vector on the second feature vector to determine whether a device type from which the second phone call originated matches the device type from which the first phone call originated.

11. The system of claim 10, wherein the processor is configured to further execute the plurality of computer program instructions to:
indicate that the first phone call is spoofed when the determined device type does not match an expected device type for the phone call.

12. The system of claim 10, wherein the feature vector is based upon at least one of a mean, a median, a variance, a standard deviation, a frequency, a wavelength, an amount of time, a coefficient of variation, or a percentile associated with the DTMF tone.

13. The system of claim 10, wherein the processor is configured to further execute the plurality of computer program instructions to:
train the machine learning model based plurality of recordings of DTMF tones associated with a plurality of device types.

14. The system of claim 10, wherein the device type is at least one of a Voice over Internet Protocol (VoIP) phone, a smartphone, or a softphone.

15. A computer-implemented method comprising:
receiving, by a computer, a first dual tone multi frequency (DTMF) tone associated with a phone call originating from a phone number and device type;
generating, by the computer, a DTMF fingerprint associated with the phone number and device type based upon the first DTMF tone, the DTMF fingerprint being a machine learning model;
receiving, by the computer, a second DTMF tone associated with a second phone call originating from the phone number;
generating, by the computer, a feature vector from the second DTMF tone;
executing, by the computer, the machine learning model on the feature vector to determine whether the feature vector of the received second DTMF tone matches the DTMF fingerprint associated with the phone number; and
in response to the computer determining that the feature vector of the second DTMF tone does not match the DTMF fingerprint associated with the phone number and device type:
indicating, by the computer, that the phone call is spoofed.

16. The computer-implemented method of claim 15, wherein the feature vector is based upon at least one of a mean, a median, a variance, a standard deviation, a frequency, a wavelength, an amount of time, a coefficient of variation, or a percentile associated with the DTMF tone.

17. The computer-implemented method of claim 15, further comprising:
in response to the computer determining that the fingerprint of the received DTMF tone matches the DTMF fingerprint associated with the phone number:
indicating, by the computer, that the phone call is not spoofed.

18. The computer-implemented method of claim 15, further comprising:
training, by the computer, the machine learning model on a plurality of DTMF tones associate with the phone number to learn the DTMF fingerprint associated with the phone number.

19. The computer-implemented method of claim 15, wherein the computer is associated with an Interactive Voice Response (IVR) system and the DTMF is received in response to IVR prompts.

* * * * *